United States Patent [19]
Varghese et al.

[11] Patent Number: 5,584,016
[45] Date of Patent: Dec. 10, 1996

[54] WATERJET CUTTING TOOL INTERFACE APPARATUS AND METHOD

[75] Inventors: Thomas Varghese, Minneapolis; Jason Bright, St. Paul, both of Minn.; Randall W. Smith, Naperville, Ill.

[73] Assignee: Andersen Corporation, Bayport, Minn.

[21] Appl. No.: 195,166

[22] Filed: Feb. 14, 1994

[51] Int. Cl.⁶ .................... G06F 17/50; G06F 19/00
[52] U.S. Cl. ................ 364/468.03; 364/174.02; 364/424.24; 395/356
[58] Field of Search ............... 364/468, 474.02, 364/474.24, 512, 401, 403, 474.09, 473, 470; 395/139, 155, 161; 65/29.1, 29.11, 16.13

[56] References Cited

U.S. PATENT DOCUMENTS

| | | | |
|---|---|---|---|
| 3,391,392 | 7/1968 | Doyle | 340/172.5 |
| 3,693,168 | 9/1972 | Halkyard et al. | 340/172.5 |
| 4,058,849 | 11/1977 | Fitzgerald et al. | 364/520 |
| 4,149,246 | 4/1979 | Goldman | 364/200 |
| 4,654,805 | 3/1987 | Shoup, II | 364/474.24 |
| 4,656,603 | 4/1987 | Dunn | 364/900 |
| 4,845,651 | 7/1989 | Aizawa et al. | 364/522 |
| 4,873,643 | 10/1989 | Powell et al. | 364/468 |
| 4,885,694 | 12/1989 | Pray et al. | 395/155 X |
| 4,916,624 | 4/1990 | Collins et al. | 364/470 |
| 4,918,611 | 4/1990 | Shyu et al. | 364/474.08 |
| 4,928,252 | 5/1990 | Gabbe et al. | 364/519 |
| 4,939,666 | 7/1990 | Hardman | 364/496 |
| 4,949,280 | 8/1990 | Littlefield | 364/518 |
| 4,970,658 | 11/1990 | Durbin et al. | 364/513 |
| 4,972,318 | 11/1990 | Brown et al. | 364/403 |
| 5,091,869 | 2/1992 | Ingram et al. | 364/560 |
| 5,099,740 | 3/1992 | Minamitaka | 84/651 |
| 5,117,366 | 5/1992 | Stong | 364/474.02 |
| 5,121,334 | 6/1992 | Riley et al. | 364/474.05 |
| 5,140,530 | 8/1992 | Guha et al. | 395/13 |
| 5,150,304 | 9/1992 | Berchem et al. | 364/474.24 |

OTHER PUBLICATIONS

Computers in Industry, vol. 21, No. 2, Feb. 1993, Amsterdam, NE pp. 223–231, XP 000363474, Steven D. Jackson et al., "Automatic Generation of 2–Axis Laster–Cutter NC Machine Program and Path Planning From CAD".

Manufacturing Technology International, 1 Jan. 1990, pp. 201–202, 204, XP 000178307, Alkire T. D., "The Future of Waterjet Cutting".

ZWF Zeitschrift Fur Wirtschafliche Fertigung Und Automatisierung, vol. 86, No. 3, 1 Mar. 1991, pp. 117–121, XP 000202696, Pham T. T. et al, "Automatisierte Attribut–Programmierung Fur Die Laser–Blechfertifung".

VDI Zeitschrift, vol. 135, No. 5, 1 May 1993, Dusseldorf, DE, pp. 32, 35037, XP 000303847, Westkamper et al., "3D)Schachtelungssystem Fur Die Fertigung Kleiner Frasteile Aus Plattenmaterial".

Primary Examiner—Joseph Ruggiero
Attorney, Agent, or Firm—Merchant, Gould Smith, Edell Welter & Schmidt

[57] ABSTRACT

An improved cutting device control system for analyzing designs, blueprints, and other drawings, and for creating low level computer instructions to fully automate the cutting process is provided. The program utilizes several algorithms, constraints, and program features to fully automate creation of the instructions—thereby eliminating the need for an operator to input cutting, moving, or operating instructions to the cutting device. The apparatus includes a microprocessor and associated memory to store the various programming steps, to store the various data tables, and to implement the algorithms and programmed constraints. Additionally, the preferred apparatus includes associated communication devices for transmitting the generated codes to the electronic controller for the cutting device, Similarly, the input format may also be transmitted to the microprocessor.

20 Claims, 14 Drawing Sheets

```
ENTITIES
 0
CIRCLE
 8
LAYER1
 62
    0
  6
CONTINUOUS
 10
1.375
 20
13.54872
 30
0
 40
1.5806304
 0
    .
    .
    .
DXF
```

FIG.10bII 
FIG.10bIII 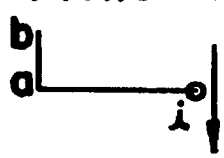
FIG.10bIV 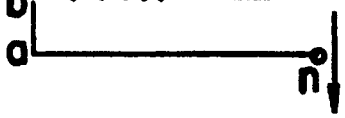
FIG.10bVI 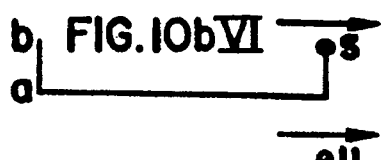
FIG.10bVII 
FIG.10bVIII 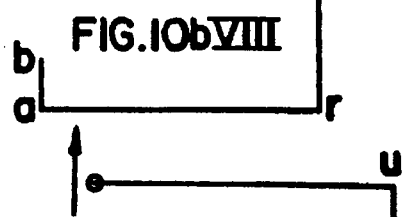
FIG.10bIX 

FIG.10bXI 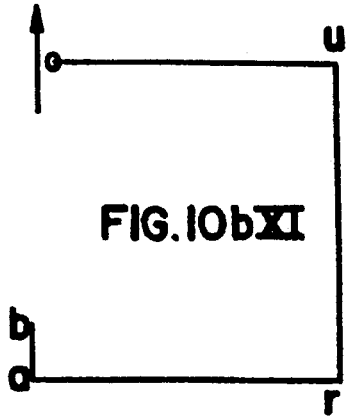
FIG.10bXII 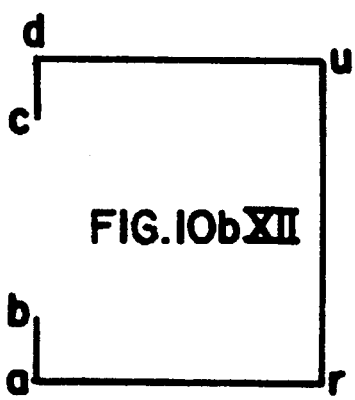

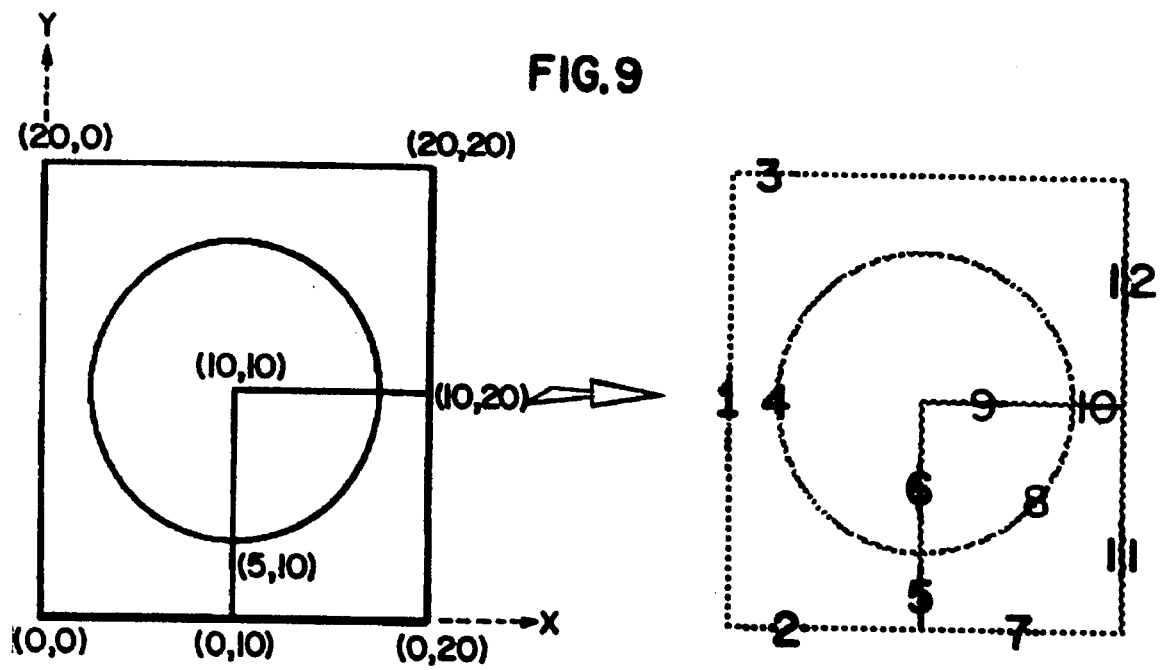
FIG. 9
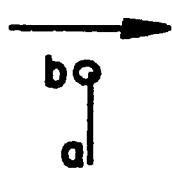
FIG.10aI
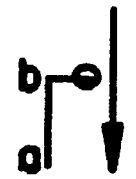
FIG.10aII
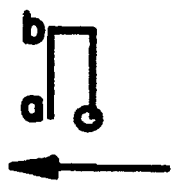
FIG.10aIII
FIG.10aIV

WATERJET CUTTING TOOL INTERFACE APPARATUS AND METHOD

FIELD OF THE INVENTION

This invention relates generally to automating a manufacturing process, and more particularly to a method and apparatus for automatically generating machine instructions from a computer aided design ("CAD") drawing in order to control a waterjet cutting device.

BACKGROUND OF THE INVENTION

There are currently several known devices that are capable, with operator input, of utilizing electronically stored CAD drawings to generate cutting instructions for two-dimensional cutting devices. It will be appreciated that generally X-Y coordinate based instructions are used to provide a physical reference for these types of cutting devices. The cutting instructions are generally written in a control code format (e.g., computer numeric control or "CNC") or other low-level programming language used for the various cutting devices' machine controllers. As those skilled in the art will appreciate, however, low level computer languages, such as the CNC type format, are both difficult and tedious languages in which to program.

Many plans and detailed specifications are now being written with CAD type programs, which generally outputs a standardized file format known as "DXF." One example of a CAD type program is AUTOCAD. The DXF format is a higher level language which includes information on each of the elements in the drawing (i.e., draw primitives), including lines, arcs, etc. The information itself is provided in terms of X-Y coordinates and includes size, location, etc. of the various draw primitives.

The CAD programs and the standardized DXF output includes drawbacks such as rounding errors and does not contain very much information on the drawing—other than the basic information on the draw primitives. Due to these drawbacks, the DXF output cannot be immediately translated into CNC, since the CNC controller cannot compensate for the information missing from the DXF output and the rounding errors.

Programs have previously been created (e.g., NC Autocode) which prompted an operator to manually format and insert certain information into a DXF file. This human interface allowed a transition to occur between the DXF format into the CNC format. By these methods, when an object was to be cut, an operator was required to determine cutting paths by using a "point and click" program to define starting and ending points for each segment that needed to be cut. This was done one after another for each line, segment, arc, which required cutting. The program would then insert the manually entered information in order to make a direct translation of the code into CNC. This method had several drawbacks, including that the programs did not have enough information about the overall CAD design. Therefore, when using these methods, the efficiency and optimization of the translation of DXF into CNC became solely dependent upon the operator's skill. The programs took large amounts of time to operate since they required constant stopping for operator input.

More specifically, in the past the programs which translated CAD generated DXF files into a machine code format required a human operator to determine the cutting outlines, the punch points, and the quickest path from one location to another. It also required the operator to determine when to turn the cutting device on and off, determine when to actuate other elements of the cutting device (i.e., the abrasive in a water jet device), determine the direction to cut each piece, and determine when to free pieces which may be located or cut inside of one another. Still further, the operator had to satisfy the constraint of cutting from left to right or in some other known manner, satisfy the constraint of minimizing the punching of holes, and determine where to punch necessary holes. As noted above, this was typically done in add-on packages to a CAD type program with the results being output directly into CNC instructions. An example of this type of program is CAMBAAL, a program from a manufacturer located in Sweden.

Other programs such as FABRICAM software manufactured by Metalsoft of Santa Anna, Calif. is a full fledged data entry CAD system, and reads CAD format files. However, this program suffers from the same drawbacks as the systems discussed above.

One well known example of a two dimensional cutting tool is a waterjet cutting device manufactured by Ingersoll-Rand. This waterjet uses an X-Y coordinate scheme to accurately cut glass, plastics, metals, and the like with a high pressure waterjet. An abrasive is included in the high pressure stream of water. Many other uses of a waterjet are known. For example, a waterjet can also be used to cut candy, frozen pies, and other foodstuffs. In the latter examples, a different fluid (such as cocoa butter) may be used, and an abrasive may not be necessary. In the waterjet, a low level code is generated by a controller which is fed CNC instructions. The CNC instructions are provided either from a human programmer or from a prior art "point and click" translation program. Thus, this system suffers several drawbacks including detailed operator involvement and inaccuracies generated from the CAD program.

Therefore, as can be appreciated, the prior methods of analyzing and providing instructions to a two-dimensional cutting system is characterized by complex, inefficient, and time consuming programs. The present invention addresses these problems associated with human intervention systems by, among other things, using several programmed algorithms and constraints running in connection with a computing device to automate the procedure of generating instructions to a cutting device from a DXF file.

SUMMARY OF THE INVENTION

The present invention provides for an improved cutting device control system for analyzing designs, blueprints, and other drawings, and for creating the proper low level computer instructions to fully automate the cutting process. The program utilizes several algorithms, constraints, and program features to fully automate creation of the instructions—thereby eliminating the need for an operator to input cutting, moving, or operating instructions to the cutting device.

In a preferred embodiment of an apparatus constructed according to the principles of this invention, the apparatus includes a microprocessor and associated memory to store the various programming steps, to store the various data tables, and to implement the algorithms and programmed constraints associated with the present invention. Additionally, the preferred apparatus includes associated communication devices for transmitting the generated codes to the electronic controller for the cutting device. Similarly, the input format may also be transmitted to the microprocessor.

Those skilled in the art will appreciate the various characteristics associated with waterjet cutting devices (and other two-dimensional cutting systems) and the constraints associated with its operation. These characteristics and constraints require its movement and action during the cutting process to operate in a certain manner. Although it will be appreciated by those skilled in the art, a brief background on why manipulation of DXF data is required to place the data into a CNC format will be provided below.

Therefore, according to one aspect of the invention there is provided a method for generating cutting instructions from a pattern stored in a known format, the format being of the type output from a computer aided design software program, comprising the steps of: (a) loading a pattern from a known format into a computer memory location, wherein the pattern includes one or more draw primitives; (b) applying a set of predetermined rules to the draw primitives to determine a cutting path along the one or more draw primitives without operator intervention; and (c) determining cutting instructions from the cutting path.

According to another aspect of the invention, there is provided a method of generating cutting instructions for a glass pattern having one or more panes formed with known objects, the objects including arcs, circles, lines, and complex objects and each object having known geometrical relationships to the other objects, the method comprising the steps of: selecting a desired glass pattern; reading the DXF file associated with the desired glass pattern; sorting the list of objects according to the bounding box of the individual objects; determining the location of each pane to be cut and the exterior edge of the pattern; finding the starting pane to be cut according to predetermined criteria; determining a cutting path along an object; and generating cutting instructions.

According to yet another aspect of the invention, there is provided an apparatus for generating cutting instructions for a waterjet device from an art glass pattern having one or more panes and stored in a DXF format file, the DXF format file being of the type output from a computer aided design software program, the apparatus comprising: means for reading a pattern including one or more draw primitives, wherein associated with the draw primitives is data representative of the spatial relationship between the draw primitives in the pattern; means for applying a set of predetermined rules to the draw primitives, wherein the draw primitives are ranked relative to one another and the panes are determined; and means for generating a cutting path along the ranked draw primitives, wherein cutting instructions are determined automatically without operator input.

These and other advantages and features which characterize the present invention are pointed out with particularity in the claims annexed hereto and forming a further part hereof. However, for a better understanding of the invention, its advantages and objects attained by its use, reference should be made to the drawing which forms a further part hereof, and to the accompanying descriptive matter, in which there is illustrated and described a preferred embodiment of the present invention.

BRIEF DESCRIPTION OF THE DRAWING

In the Drawing, wherein like reference numerals and letters indicate corresponding elements throughout the several views:

FIG. 9 is a diagrammatic illustration of a ranking of the various entities of a DXF file by bounding box order (i.e., by minimum X and minimum Y);

FIGS. 10aI–10aIV and 10bI–10bXII are diagrammatic representations of the path taken to determine the outside edge of each piece of the DXF file, wherein FIGS. 10aI–10aIV illustrate movement in one direction from point a to point b, and FIGS. 10bI–10bXII illustrate movement in the second direction from point b to point a.

DETAILED DESCRIPTION OF THE PREFERRED EMBODIMENT

Figure 1:
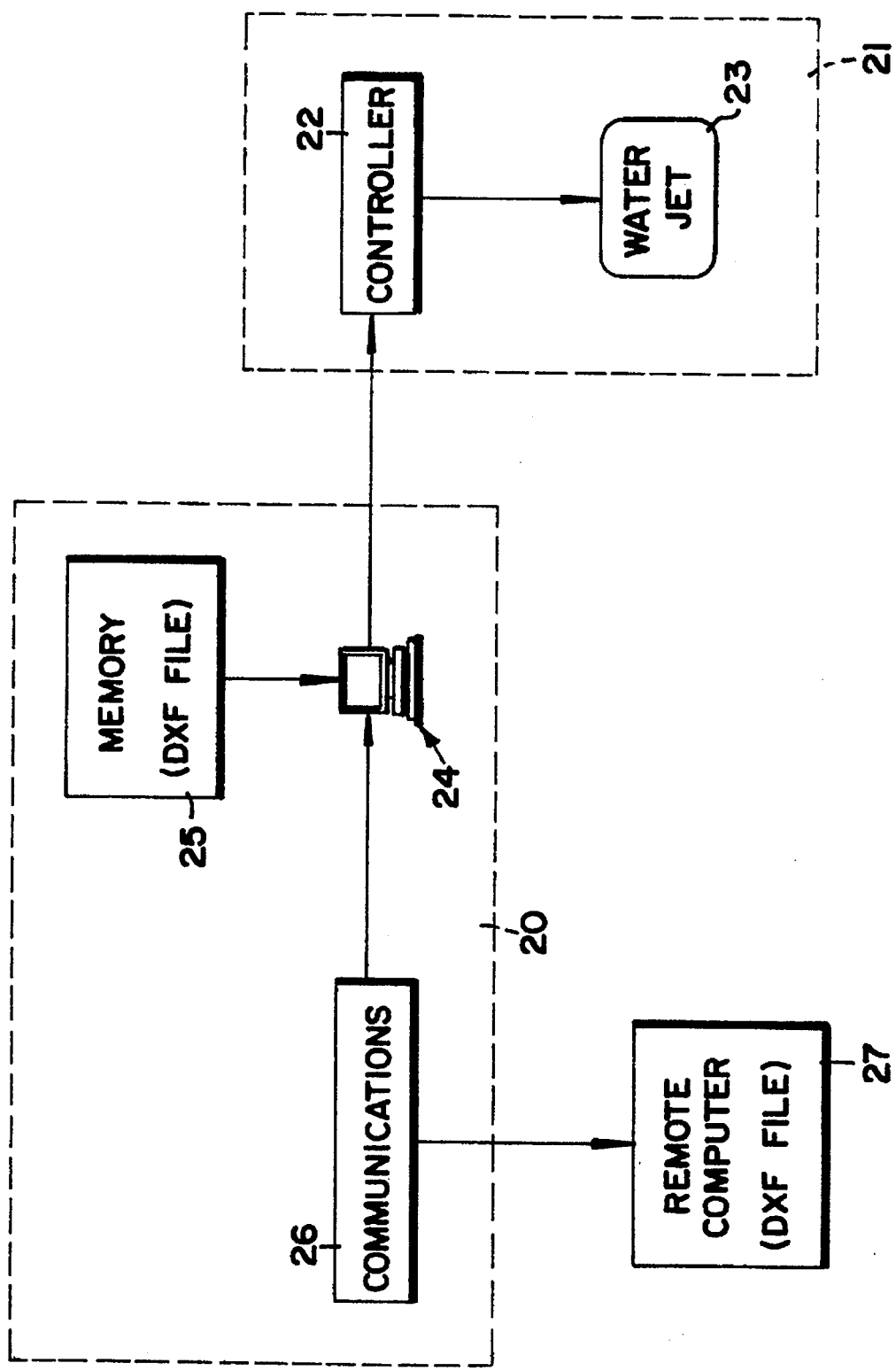
FIG. 1 is a block diagram illustrating the system wherein a device constructed according to the principles of the present invention may be utilized.

The principles of this invention apply to the analyzing of objects of a DXF file for processing and generating computer instructions for controlling a cutting system. Typically, and in the preferred embodiment, the instructions are generated to control a two-dimensional cutting system, although three-dimensional cutting devices may also be used. The apparatus generates the controller code automatically based on predetermined constraints which optimize operation of the cutting system and eliminates the need for operator intervention. A preferred application for this invention is in the controlling of a waterjet cutting device. Such application, however, is typical of only one of innumerable types of applications in which the principles of the present invention can be employed.

Although the preferred embodiment described herein is used in connection with a water jet cutting device used to cut glass, such example should not be viewed as limiting. The principles of the present invention apply to other two and three-dimensional cutting devices (such as lasers, ultrasound, lathes, hot-wire, and band saw applications) and other materials which are cut, such as foodstuffs, wood, metal, plastics, etc.

Prior to describing the preferred apparatus and method, a brief description of a DXF file and the waterjet constraints utilized in the preferred embodiment are briefly set forth. It should be appreciated that these constraints are useful in the preferred application of cutting glass, but that such constraints may vary with different two-dimensional cutting devices and applications and, therefore, should not be viewed as limiting.

A DXF file is a linearly organized file which includes information about where each of the lines and other objects of the design are located. The objects and other lines are oriented relative to an X-Y plot generated by the CAD program output in the DXF file. The file itself is basically a negative image. As those skilled in the art will appreciate, the lines in the DXF file are "punched out" in a waterjet type system. However, unlike a plotter or other computer type device, a waterjet has several constraints which are not associated with plotter devices. Accordingly, the method and organization of the cutting needs to be carefully controlled.

First, holes cannot be punched at random, since the initial punch destroys material which surrounds the punch. Further, a punch is required in order to cut from a point. Therefore, a punch always needs to be maintained at a distance from objects that are final piece parts. At least one punch is required in order to begin cutting. It will be appreciated that non-brittle materials are less prone to damage when holes are punched.

Second, a small piece should not be passed over by the cutting device when the cutting device is operating after the small piece has been completely cut. In such an event, the small piece may dislodge and thereby potentially cause the cutting device to jam or be damaged. Additionally, the small piece may dislodge and damage itself or other pieces.

Third, an effort should be made to cut complete pieces before moving to a next piece. For example, the cutting device should not cut a portion of a piece, leave to cut a different piece, and then return to complete the outline of the first piece. It will be appreciated that by not completely cutting a piece, the material may move slightly in the meantime which will destroy the accurate referencing of the piece.

Fourth, a larger piece should not be freed before all detailed pieces inside the larger piece have been cut. Thus, if an object that is completely surrounded by other pieces is included, all the internal cuts should be made before cutting the surrounding piece. In this regard, this constraint is related to the third constraint (i.e., the material may move prior to freeing the larger piece).

In order to satisfy these various constraints, it has been heuristically determined that generally starting from the lower left-hand corner and moving generally to the right, while cutting complete pieces and while not freeing pieces before internal detail has been cut, is desireable. Other methods of cutting may be more efficient, and use of beginning cutting from the lower left-hand corner should not be viewed in a limiting manner. Other types of cutting which were considered include cutting the pieces closest to the X-Y origin.

Fifth, in order to maximize the efficiency of the waterjet, it is imperative to minimize motion without the waterjet being on. The amount of time required for the waterjet to complete a cutting is directly proportional to the amount of movement it makes—both with the waterjet on and off. Accordingly, every time a movement is made without cutting occurring, cutting time is being increased.

Referring now to the Figs., there is illustrated a preferred embodiment of an apparatus configured in accordance with the principles of the present invention. The apparatus and device are generally referred to by the reference numeral 20. The system in which the apparatus 20 is employed is illustrated in FIG. 1 as including waterjet controller 22 which accepts CNC instructions (either resident or input) and converts it into a very low level machine code instruction format (e.g., MCIF). One such controller 22 which operates in this manner is of the type manufactured by Philmore Systems Inc., with a preferred add-on board being made by Extratech Corporation of Post Falls, Idaho. Such controller and add-on boards are well known in the art and so will not be discussed further herein. The controller 22 may also preferably be a general or personal computer (e.g., such as an IBM PC with a motion control card).

The preferred embodiment waterjet cutting device 23 is of the type which accepts MCIF instructions and cuts materials using water, a high pressure water nozzle, and an abrasive included in the water. The device 23 cuts in a single plane described by an X-Y Cartesian coordinate system. Accordingly, the cutting instructions for device 23 are referenced according to such coordinate system. The cutting nozzle (not shown) is moved by actuators, such as D.C. servo motors in accordance with MCIF instructions generated by the controller 22. In the preferred embodiment, waterjet cutting device 23 is manufactured by Ingersoll-Rand of Michigan having the model designation HS1000.

Still referring to FIG. 1, general purpose computer 20 includes a microprocessor 24 and memory block 25. Additionally, the computer 20 includes communication block 26 for communication with remote devices 27. The general purpose computer 20 can be one of several readily available personal computers, including the Macintosh computer manufactured by Apple Computers or a personal computer using the DOS or UNIX operating systems. In the preferred embodiment, the computer instructions are written in C, C++, and in Macintosh applications programs. Those skilled in the art, however, will recognize that other programming languages, such as Pascal and COBOL might similarly be utilized. It will also be recognized that a single computer may optionally be used in lieu of controller 22 and processor 20.

While not specifically detailed in the Figs., it will be understood that the various microprocessors, controllers, etc. are to be properly connected to appropriate bias and reference supplies so as to operate in their intended manner. Similarly, it will be understood that appropriate memory, buffer and other attendant peripheral devices are to be properly connected to microprocessor 20 and controller 22 so as to operate in their intended manner.

The DXF files utilized by microprocessor 20 contain information about each draw primitive/entity contained in the CAD drawing. An example of a portion of an output DXF file is set forth in FIG. 2. In this example, a circle is defined with its center at 1.375 (X coordinate), 13.54872 (Y coordinate), and 0 (Z coordinate). The circle's radius is 1.5806304, and is of the continuous line type.

The DXF file is read into memory 25 by computer 20. The DXF file may originally be located in any number of areas, and the example provided herein should not be viewed as limiting. For example, the DXF file may be stored on a magnetic media, such as a floppy disk, a hard disk, or a tape, it may be stored in a EEPROM type device, or it may be transmitted from a remote computer 27. Once the computer 20 reads the DXF file, the information contained therein is stored in a data table.

Figure 11:
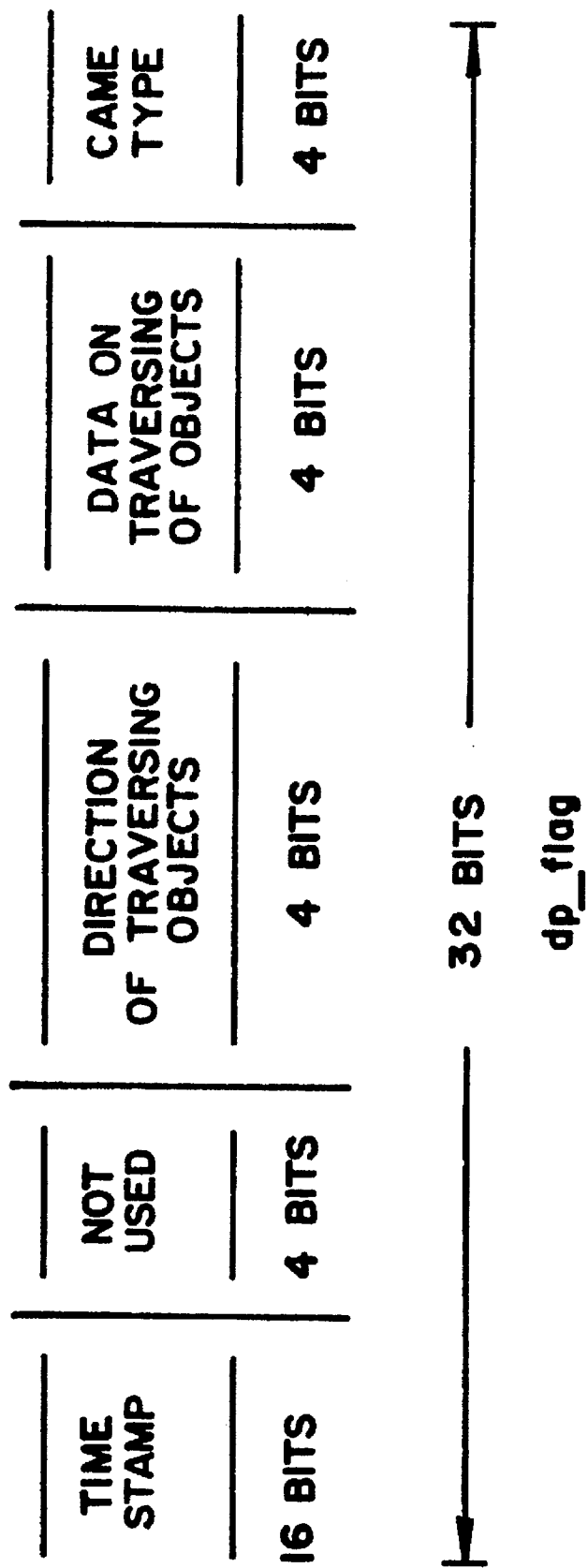
FIG. 11 illustrates the memory structure of the dp_flag which stores information relative to the movements of FIGS. 10aI–10aIV and 10bI–10bXII.

AlthoUgh the DXF format contains information for each DXF entity, it does not provide any information relative to the other entities. As used herein the term "entity" is used equivalently to the term draw primitive. Additional information on the entity section of the DXF file may be found documented in the various CAD release manuals. The entity information is input in computer 20 and maintained in a structure internal to the "manufacturing engine" (i.e., that part of the software resident in computer 20 which reads the DXF file, generates cutting instructions, and creates CNC instructions). A subpart of the structure is illustrated in Table 1 below. As used herein, the term entity includes lines, arcs, polylines, rectangles, and text of the DXF file. The structure is a block in memory that is documented as follows in Tables 1 and 2:

The structure draw_primitive initially includes several flags. First, dp_flag, is a draw primitive flag that is used to contain tracking information. The information set in dp_flag is shown in FIG. 11. Also, a draw primitive flag (dp_flag_drt) for the design reading tool is included. The design reading tool is a separate module which reads the DXF file and converts the data to an intermediate format to

TABLE 1

```
struct   draw_primitive {
         long      dp_flag;
         long      dp_flag_drt;
         long      dp_dxf_line;
         char      dp_type;          /* LINE, ARC, POLYLINE, RECT, TEXT,
         char      *dp_layer;        /* layer
         char      *dp_line_type;    /* line type
         char      dp_priority;
         char      dp_pane_type;
         char      dp_color;         /* dp_color
         struct    pnt **dp_int_array;
         struct    draw_primitive *dp_Next;/* next primitive in this object */
         union     dp_union {
                   struct    dp_line {   /* LINE info */
                   struct pnt *DP_p1, *DP_p2;
                        } dp_line;
                   struct    dp_arc {   /* ARC info */
                             /* all arcs are drawn counter clockwise */
                        struct pnt *DP_startp, *DP_endp;/* start and end
                                  points (same if circle) */
                        struct pnt *DP_center;
                        } dp_arc;
                   struct dp_polyline {   /* POLYLINE info */
                             struct pnt *DP_vertex_list, *DP_end-vertex-list;
                             long DP_vertex_count;
                        } dp_polyline;
                   struct dp_text     {
                             struct pnt *DP_insert_position, *DP_alignment;
                             char *DP_value;
                        } dp_text;
                   struct dp_block    {
                             struct pnt    *DP-insert;
                             char *DP_block_name;
                        } dp_block;
                   } dp_union;
                   struct pnt dp_max, dp_min;      /* bounding box */
```

TABLE 2

```
/* these defines are used to make this structure planar */
/* -- LINE Components -- */
#define     dp_p1                dp_union.dp_line.DP_p1
#define     dp_p2                dp_union.dp_line.DP_p2
/* -- ARC Components -- */
#define     dp_center            dp_union.dp_arc.DP_center
#define     dp_startp            dp_union.dp_arc.DP_startp
#define     dp_endp              dp_union.dp_arc.DP-endp
/* -- POLYLINE Components -- */
#define     dp_vertex_list       dp_union.dp_polyline.DP_vertex_list
#define     dp_end_vertex_list   dp_union.dp_polyline.DP_end_vertex_list`
#define     dp_end_vertex_count  dp_union.dp_polyline.DP_end_vertex_count
/* -- TEXT Components -- */
#define     dp_ins_pos           dp_union.dp_text.DP_insert_position
#define     dp_align             dp_union.dp_text.DP_alignment
#define     dp_value             dp_union.dp_text.DP_value
/* -- BLOCK Components - */
#define     dp_insert            dp_union.dp_block.DP_insert
#define     dp_block_name        dp_union.dp_block.DP_block_name
```

Although the general function of the memory structure set forth in Tables 1 and 2 will be readily apparent to those skilled in the art, a brief description of the various elements of the memory structure follows.

allow another program to use the information. The DXF output file format (dp_dxf_line), and the draw primitive type (dp_type) is read from the DXF format file. The draw primitive type can include lines, arcs, polylines, text, etc. (with circles being a special case of an arc).

The next element in the structure is the draw primitive layer (dp_layer), which is a DXF characteristic specifying the named layer that the draw primitive was found on. Next, is the dp_line_type, which specifies the type of line that the draw primitive should be drawn with. For example, various lines may be specified by the CAD output file such as continuous lines, dashed lines, dash dot line, etc. The dp_priority follows in the structure and is used by the design reading tool. It is not used by the waterjet device 21. The dp_priority is derived from the Z coordinate of the draw primitive and as such is not specifically a DXF characteristic.

Next in the structure is the draw primitive pane type (dp_pane_type). This is derived from the text associated with each pane in a DXF file, and is also not specifically a DXF file characteristic. After the pane type is the draw primitive color (dp_color), which is a DXF characteristic. This element describes the color of the draw primitive as read directly from the DXF format.

Continuing in the structure, the next element is the draw primitive intersection array of the draw primitive (dp_int_array). This variable is used whenever a call to find intersections is made. For example, a pointer is created in order to locate lines that touch the draw primitive which is being worked on. Accordingly, this is a calculated element of the memory structure and is not a DXF characteristic. dp_next is a pointer to the next draw primitive as read from the DXF file.

Also in the memory structure is a union for pointing to the various object characteristics to the same physical memory. The program operates to interpret the data depending on what type of object each individual draw primitive is assigned to. For example, if the draw primitive type is a line, then it has two end points. That information is a DXF characteristic and can be read directly into memory. However, if the draw primitive type is an arc, then it has a starting point, an ending point, and a center point. If the draw primitive was specified in any of the other five ways an arc can be specified, then it would require conversion to this format before processing is started. If it is a polyline, then it has a pointer to a list of sub-objects. Polylines are made up of any other number of other draw primitives/entities (i.e., a polyline can be made up of other polylines, arcs, and lines, but not of text). Accordingly, it will be apparent to those skilled in the art that the two end points of all three types of primitives share the same location in the structure. If it is a textual item, then there is an insertion position. The alignment and the string are inserted as read directly from the DXF format.

Finally, associated with each draw primitive is a minimum and a maximum, which is defined as a bounding box (discussed below). The bounding box is calculated immediately upon reading the DXF draw primitive and is updated whenever a change is made to the draw primitive.

The logic flow diagram of an embodiment of the program logic which might be resident in the microprocessor is illustrated in FIGS. 3a–3e, wherein the logic diagram is generally shown at 100. The logic flow diagram at 100 illustrates the steps taken to analyze the input DXF file, generate cutting instructions, and translate the resulting DXF file into CNC output code. Although the controller will be characterized as proceeding from logical block to logical block while describing the operation of the program logic, those skilled in the art will appreciate that programming steps are being acted on by microprocessor 24.

Figures 2, 5A:
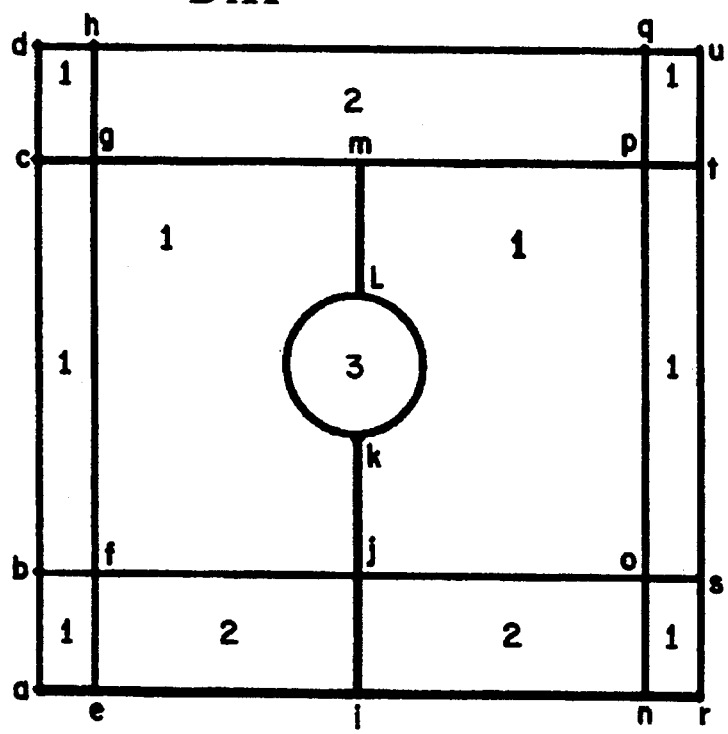
FIG. 2 is a diagrammatic illustration of a portion of a DXF format language output file from a CAD program.
FIGS. 5a–5d diagrammatically illustrate an example cutting path.

Referring first to FIGS. 3a–3d, in operation, microprocessor 24 starts at blocks 101 and proceeds to read the input DXF format file at block 102. As noted above, an example of a DXF file format and portion of a DXF file is illustrated in FIG. 2. The file may be in either two-dimensional or three-dimensional format. In the present invention, any three-dimensional information will be retained, but all cutting will assume a two-dimensional orthogonal projection to the X-Y plane. The information received from the DXF file includes one or more entities. These entities are pieces that make up the drawing. An entity may be a line, arc, circle, or polyline (which is made up of a combination of multiple lines, arcs, or circles).

Figure 4:
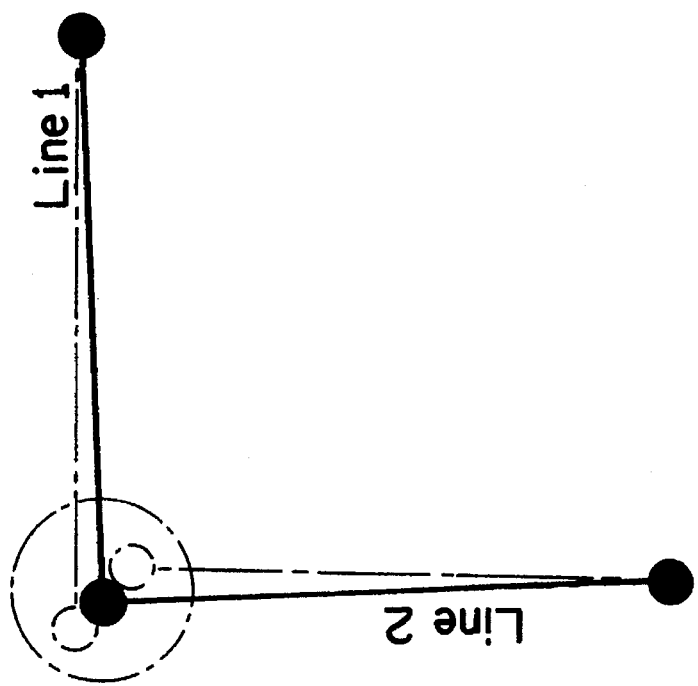
FIG. 4 is a diagrammatic illustration of the optional averaging (by the program logic) of two entities in order to eliminate drawing and tolerance errors.
Figure 4:
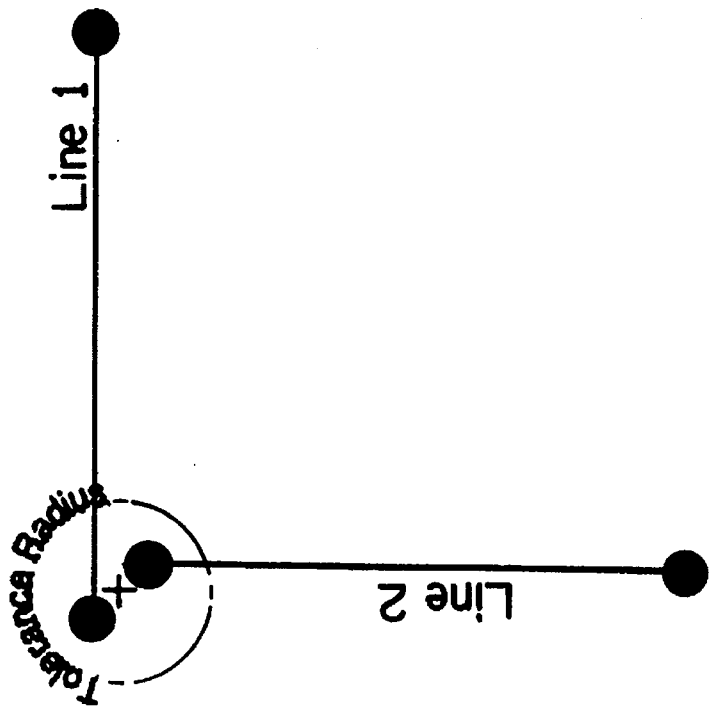

Proceeding to block 103, optionally the errors in the DXF file format are corrected. As those skilled in the art will appreciate, the DXF file format may contain user errors and inaccuracies from limitations of floating point representations. These errors and limitations are referred to herein as tolerance radius errors. For example, if two points are within a specified tolerance, they are assumed to be coincident. The program can correct the error by adjusting each of the lines to meet at a common point by averaging the difference of the two. FIG. 4 illustrates two lines within a tolerance radius and the optional averaging which can occur to the two lines—resulting in a common end point. Those skilled in the art will appreciate that if the tolerance radius is less than the kerf width of the cutting device, then the tolerances may not require adjustment.

Proceeding to block 104, the program inquires whether the edge of the material to be cut needs to be extended. In the preferred embodiment, the material being cut is glass to create a "stained glass" or art glass panel. The design in the DXF file is the actual sized panel, however, the panel must be extended to fit into a perimeter came or frame piece. Accordingly, the perimeter of the design is extended. An example of another operation wherein an edge extension may be desireable or required is in cutting a jigsaw puzzle in order to compensate for the kerf width. Other methods of using this feature will be apparent to those skilled in the art.

If the edge is extended, then the microprocessor 24 proceeds to block 105 where the list of draw primitives is sorted by X coordinate (i.e., by bounding box). This is a performance enhancing feature which enhances the speed of the intersection calculation—by eliminating most of the draw primitive list—with minimal calculation. When the intersection calculation for the draw primitives is checked in this manner, only those objects which have bounding boxes that overlap the original bounding box are determined. Since the draw primitives are sorted first by the minimum X-value and then by the minimum Y-value (and the maximum X-value and maximum Y-value if still the same), none of the draw primitives have to be reviewed after the first X value which is out of range is determined—since all X values from the draw primitive list must be larger because the list is sorted. FIG. 9 illustrates diagrammatically a list of sorted draw primitives.

A bounding box is defined as the maximum and minimum x and y values that an entity occupies. It is a rectangle that spans the maximum and minimum coordinates of entities. However, for entities which are vertical and horizontal lines, the bounding box rectangle may collapse into a line (i.e, may have zero width or height respectively). Bounding boxes will be discussed in more detail below.

Still referring to FIG. 9, it will be appreciated that the X and Y coordinate values are provided by way of illustration. The data structure includes a list of entities which are sorted by X and Y values of the bounding box. Therefore, to sort by bounding box, the processor determines the entity labeled 1 to be the beginning of the list since the maximum x value is less than the maximum x value of any other entity (i.e., the minimum x value was equivalent to the minimum x value of the entity designated as 2, therefore, the maximum values also needed to be determined to conclude which entity should be designated 1 and which should be designated 2). Similarly, each of the entities are sorted by minimum x and y values and maximum x and y values.

Figure 5B:
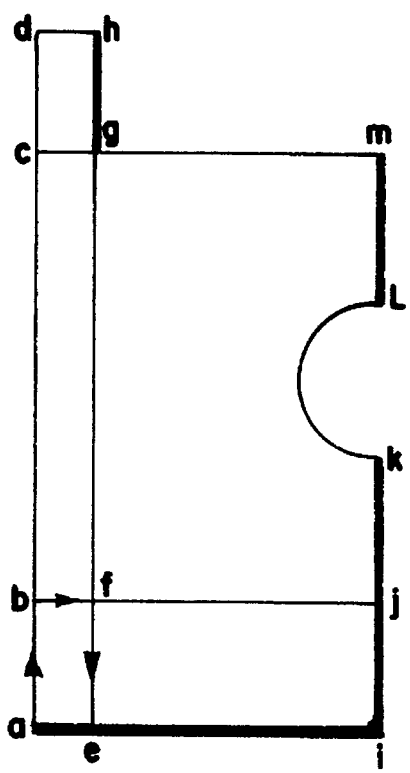

At block 106 the microprocessor 24 begins operation of the extend edges subroutine. First, at block 107, the text is separated from the draw primitive list into a text list. FIGS. 5a and 5b illustrate a sorted list (FIG. 5a), and a sorted list with text removed (FIG. 5b). The text list is ignored in this segment of the processing. The text is removed merely as a speed improvement. Continuing to block 108, all of the panes are found. This process will be discussed below in connection with block 134.

Proceeding to block 109, each of the panes which form an edge are separated and put in a separate list. At block 110, the edge is outset from its current position the desired amount.

Figure 7A:
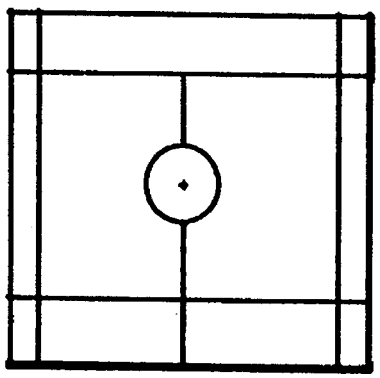
FIGS. 7a–7d are diagrammatic illustrations of the steps taken by the program logic to implement an edge extension of the various entities in FIG. 7a by determining the various pieces in FIG. 7b (together with the designated colors indicated by the numbers), determining the outside edge in FIG. 7c, and then extending the outside edge in FIG. 7d.
Figure 7B:
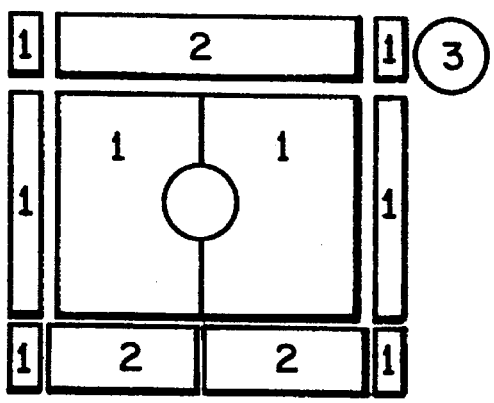
Figure 7C:
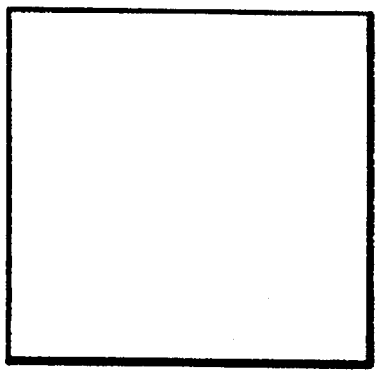
Figure 7D:
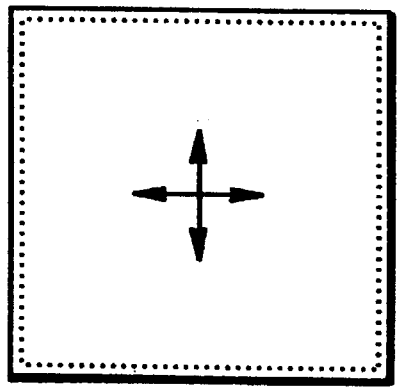

FIG. 7a diagrammatically illustrates an art glass panel design. FIG. 7b diagrammatically illustrates the output of the find all panes subroutine. FIG. 7c diagrammatically illustrates the edgepane. FIG. 7d diagrammatically illustrates the extended edge pane from its first to a second position.

Figure 6:
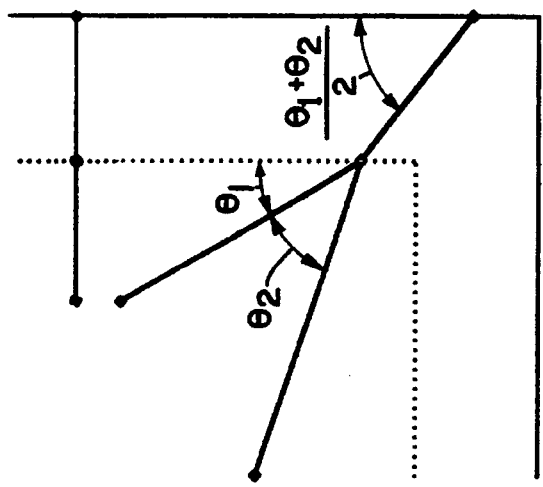
FIG. 6 is a diagrammatic illustration of the optional extension of edges (by the program logic) of the entities in the DXF file.

After the edge is extended, the endpoints of lines, arcs and other polylines touching the original edge are then located a distance away from the new outside edge and so need to be extended to the new outside edge as well. Accordingly, at block 111 the lines are extended to the new edge. It will be appreciated that single lines can be directly extended (best seen in FIG. 6). However, when two lines intersect at the old edge, then the average of the angles of incidence from the draw primitives at each point are determined and a new line is created between the old and new positions of the edges (best seen in FIG. 6). The angles of incidence of the lines are averaged in the extension line.

At blocks 112 and 113, the text list is merged back into the draw primitives and a DXF output file is generated if requested. The draw primitive list is merged since in further steps of program execution the list may be utilized. In order to optimize the modular error of the program, each module of the manufacturing engine leaves the files as it found them to allow additional modules to be added. All of the structure and other information on all of the draw primitives are maintained for this purpose.

Proceeding to block 114, it is determined whether glass types are to be separated. It will be appreciated by those skilled in the art that in the preferred embodiment, different color glass will be used in the art glass panel. Therefore, different color glass will be cut. The instructions to cut one color glass must be separated from instructions to cut a different color glass. However, if only one material is to be cut, then this step may be bypassed by proceeding to block 118 where the waterjet cutting instructions are generated. However, the waterjet instructions will be deferred pending a brief description of the glass separation logic flow.

The controller 24 first proceeds to block 115 where the text from the draw primitive list is separated into a text list. At block 116, all panes are located using the process pane description described below in connection with block 134. Proceeding to block 117, all text items in the form of colors are associated with the panes in which they are located. In essence the controller 24 takes a sort of "paint by number" approach to color separation. Thus, the text number located inside a panel preferably determines the color glass from which the panel will be cut. At block 133 each different color is written to a separate DXF file which can then be acted on separately by the microprocessor 24 in order to generate glass color specific instructions to the waterjet 23. Those skilled in the art will appreciate that, in the preferred embodiment, for each color of glass to be cut, the waterjet 23 cutting instructions must be run.

At block 118, the waterjet cutting instruction subroutine begins. First, at block 119, the list of draw primitives are sorted. However, sorting may not be required if the list has already been sorted. By checking a global sort flag variable, microprocessor 24 can determine if sorting is required. Continuing to block 120, text is separated from the draw primitive list into a text list. At block 121, all occurrences of the word "punch" are located in the text list. These then become the punch points. A punch point is a location in the glass where the waterjet is suddenly turned on. A punch point is necessary to initiate cutting, but a punch point also destroys a significant area of the glass near it. It is important to determine punch points initially in order to locate the proper cutting starting point or points. If a punch point is specified, then that point will be used. Otherwise, a punch point is generated at the lower left corner.

At block 122, all panes are located by using the process pane subroutine discussed below in connection with block 134. The processor then proceeds to block 123 to determine general waterjet instructions for the panel. First, at block 124, an instruction to generate a punch point is created. As those skilled in the art will appreciate, alternatively, a dual compression punch point may be implemented in an attempt to limit destruction caused by a punch point. A dual compression punch point is defined as slowly etching a hole in the glass at a lower pressure before turning the waterjet up to full force. However, this causes excessive wear on the waterjet and is used sparingly.

Still at block 124, all panes are sorted by bounding box. As noted above this sorting takes place to improve performance. For each pane to be cut, a minimum X-value and a minimum Y-value are determined and stored. Additionally, a maximum X-value and a maximum Y-value are determined and stored. At block 125, the starting pane is located and the steps illustrated in Table 3 occur.

TABLE 3

| Number | Description of Step |
|---|---|
| 1 | Skip any panes that are all cut. |
| 2 | Skip any panes that are null (ignored). |
| 3 | Skip any panes with panes inside them. |
| 4 | If the punch point is inside a pane, use that as a starting pane, otherwise find the nearest pane to the origin and use that. |
| 5 | With the start point find the nearest draw primitive end point and use that as one of the two end points of the lead-in line. The other end of the lead-in line may be 00 or a punch point if one was found. |
| 6 | A lead-in line is a line for the initial punch point of the first piece to be cut. The punch point destroys the glass around it and must be separated from any valuable cutting. |

The microprocessor 24 then proceeds to block 126 to generate cut instructions along the draw primitive making up the pane in the direction that yields the maximum distance cut. Each pane may be cut in either direction. Next, at block 127 the next pane is located based on the following criteria:

a) minimum distance from the Y-axis;

b) closest end point to the current position; and c) maximum distance from the Y-axis.

Each of these criteria are multiplied by a predetermined weight and added. The following expression mathematically describes this process:

If not in bounding box, then for every pane find the minimum value of Next Cut in accordance with the following equation:

$$\text{Next Cut} = K_1(\text{Min}) + K_2(\text{Distance}) + K_3(\text{Max})$$

Wherein,

Min=minimum distance to the y axis

Distance=distance between the current point and the closest uncut point in the pane Max=maximum distance from the y axis $K_1 = 0.1$ $K_2 = 0.25$ $K_3 = 0.25$ Wherein $K_1$, $K_2$, and $K_3$ are weighting factors which are empirically determined in the preferred embodiment.

At block 128, blocks 126 and 127 are repeated until all possible panes are cut.

Figure 5C:
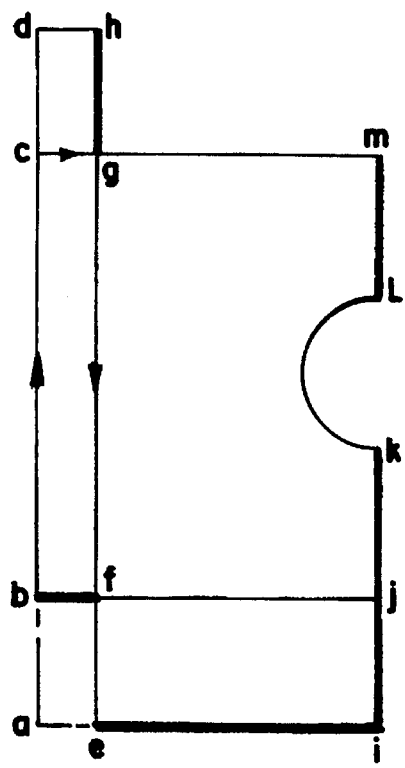
Figure 5D:
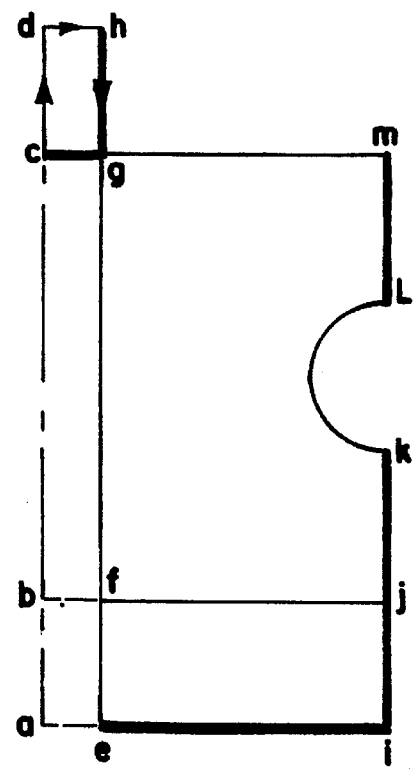

After code is generated to cut all panes the microprocessor 24 may check to see if another color (or material) is required. It will be appreciated that in the preferred embodiment, the code being generated is stored in a CNC file—having been translated immediately into that format. Further, it will be appreciated by those skilled in the art that, rather than being implemented using a batch file format, the cutting instructions might be provided to the waterjet in real time. An example of the way in which the panes might be cut is illustrated in FIGS. 5b–5d.

The waterjet 23 then cuts clockwise around the first piece a-b-e-f (the direction of cutting being indicated in FIG. 5a with arrows. The next piece is determined by finding entity b-c having the lowest minimum X and Y values. Therefore, the waterjet 23 next cuts entities b-c, c-g, and g-f. However, entity b-f has already been cut and so does not need to be cut to free this piece. The next piece is determined by finding that the entity c-d has the lowest minimum X and Y values. Therefore, the entities c-d, d-h, and h-g are cut (g-c was previously cut). The next piece is determined by finding that the entity f-g has the lowest X and Y values. Therefore, the piece f-g-m-l-k-j will be cut next.

If the next piece is in the bounding box, then the waterjet 23 keeps the water turned on. However, if the next piece is not in the bounding box, then the water is turned off to enable a movement of the waterjet 23 across the material.

The processor 24 then proceeds to block 129 where came length is determined. This is done by simply adding up the length of all draw primitives in the main list. Next, at block 130, the text list is merged back into the draw primitives. The draw primitives list may be used in further steps during the program execution. It will be appreciated that a compacting routine, such as Datanest, may be implemented at block 131 or prior to generating cutting instructions so as to minimize material usage.

The main program execution illustrated in FIGS. 3a–3d ends at block 132.

Figure 3A:
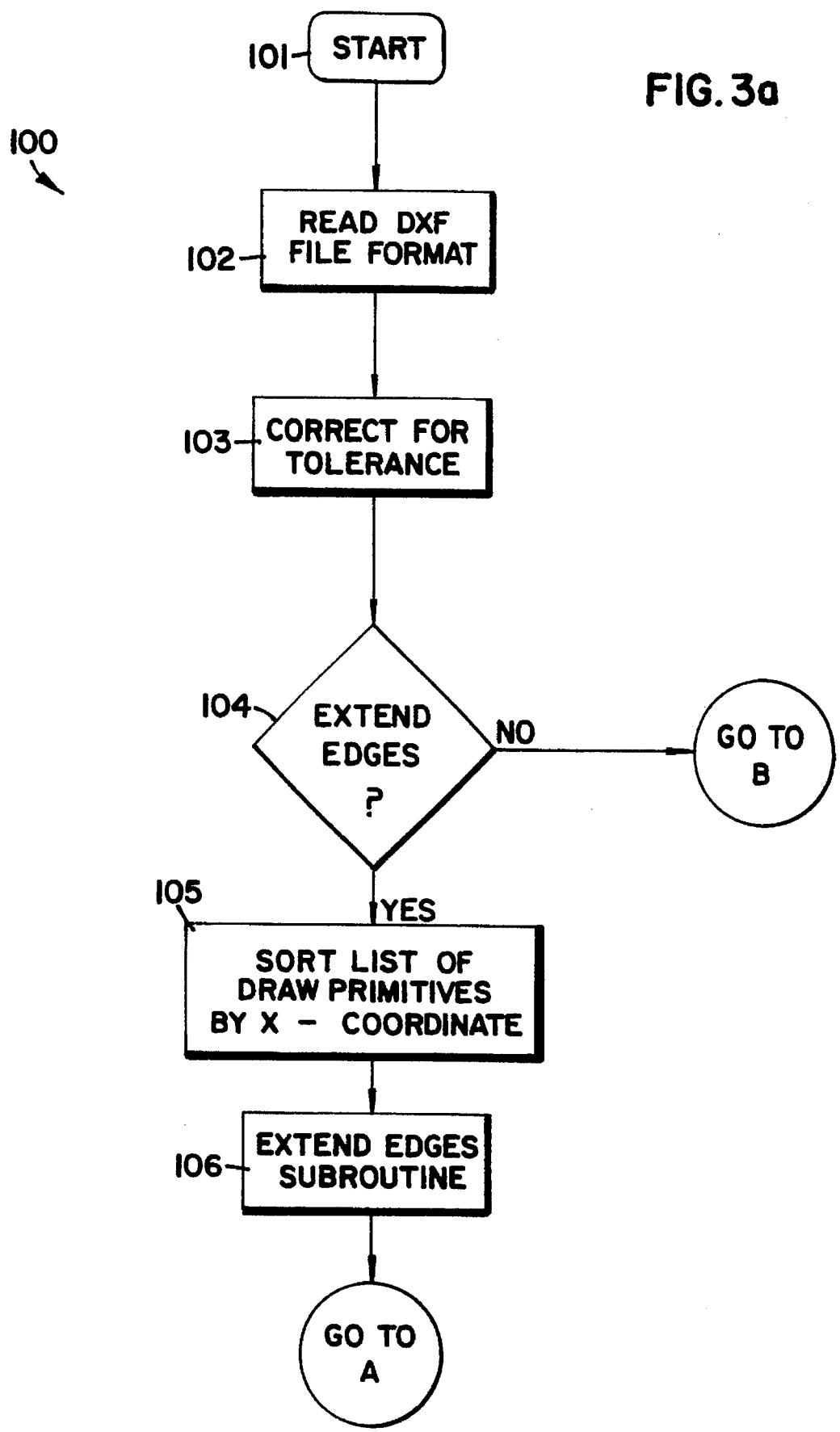
FIGS 3a–3e are logic flow diagrams illustrating computer program operation of block 24 in FIG. 1.
Figure 3B:
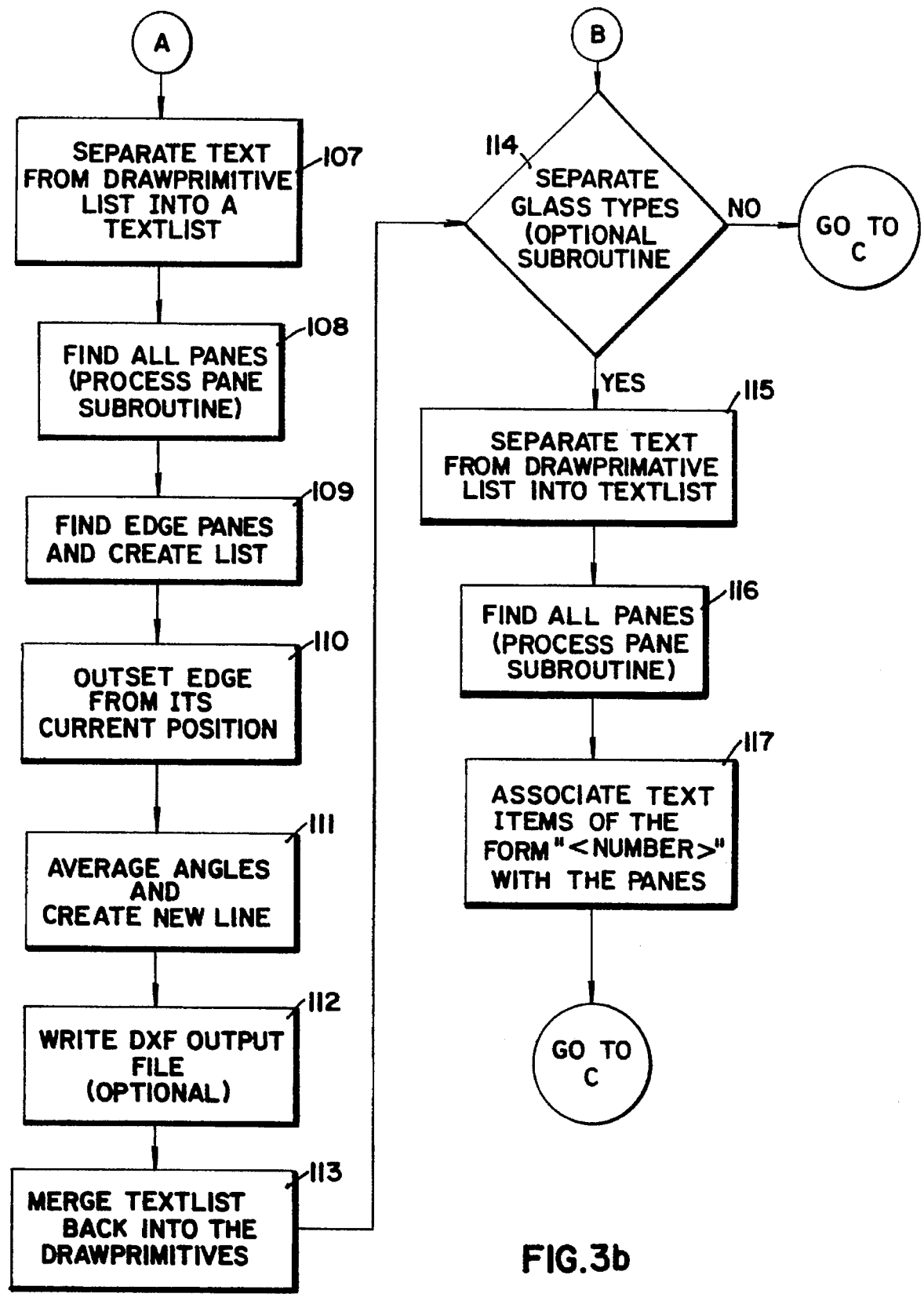
Figure 3C:
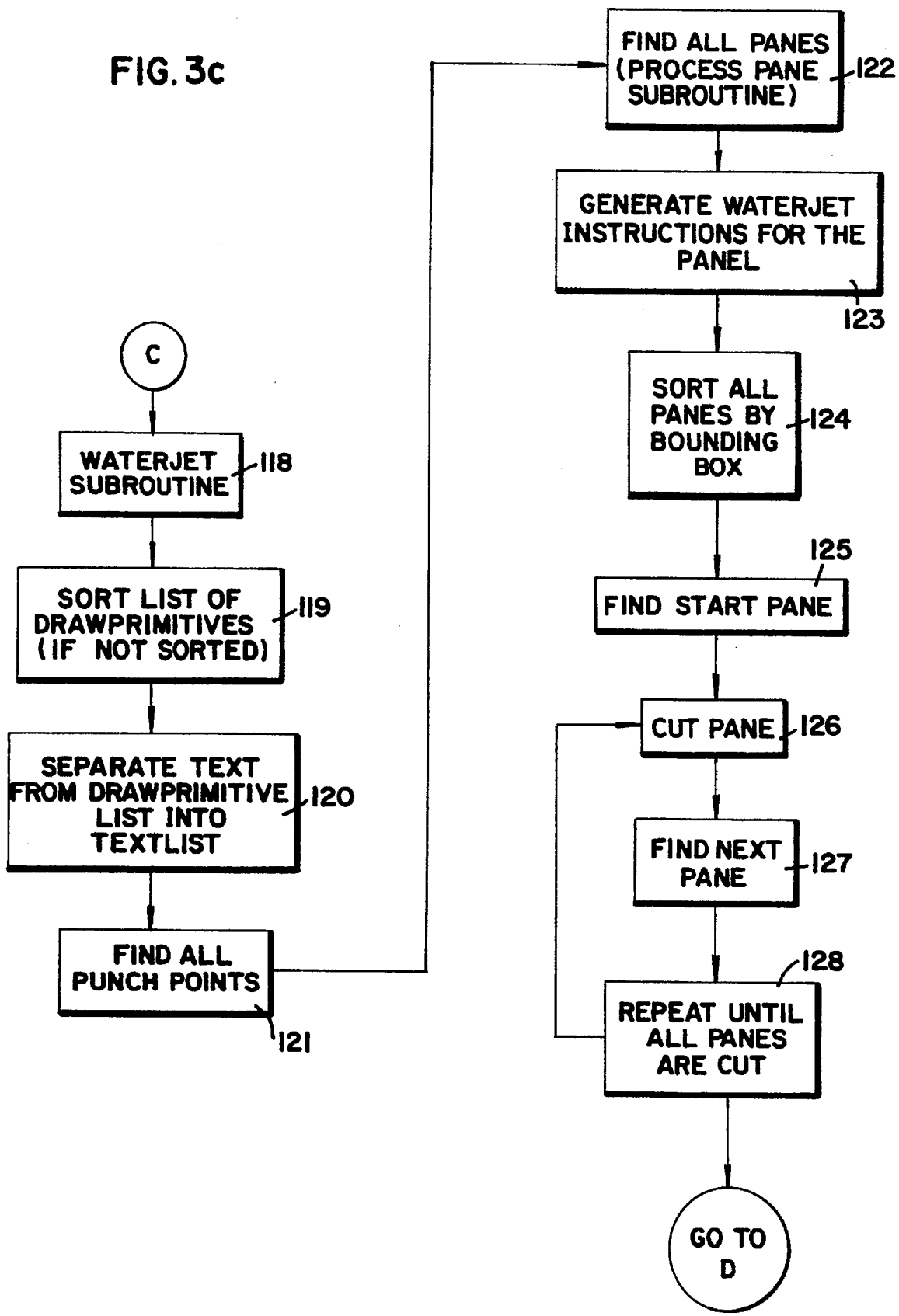
Figure 3D:
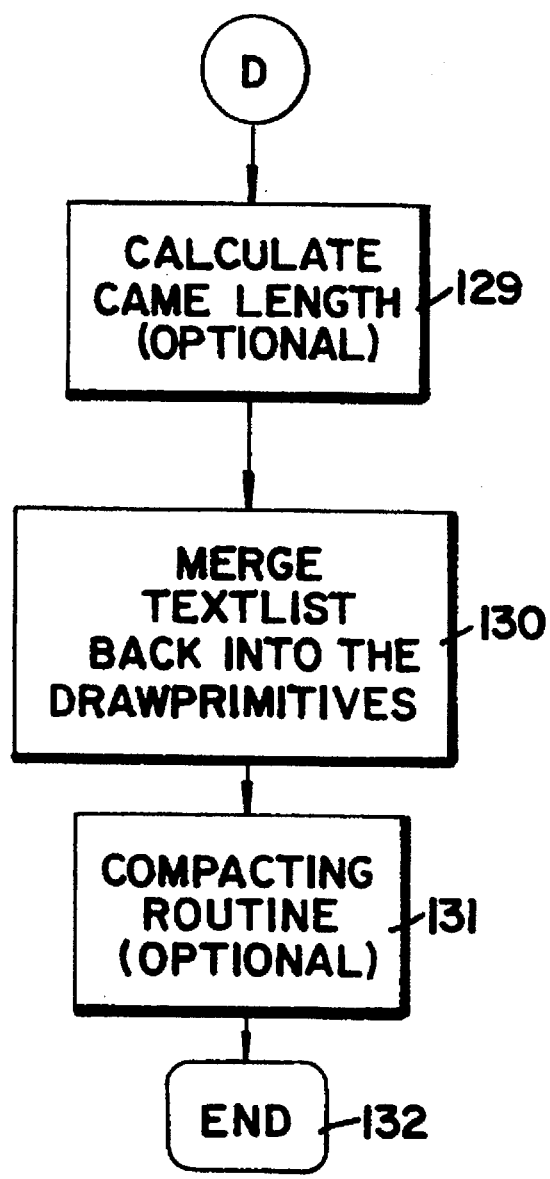
Figure 3E:
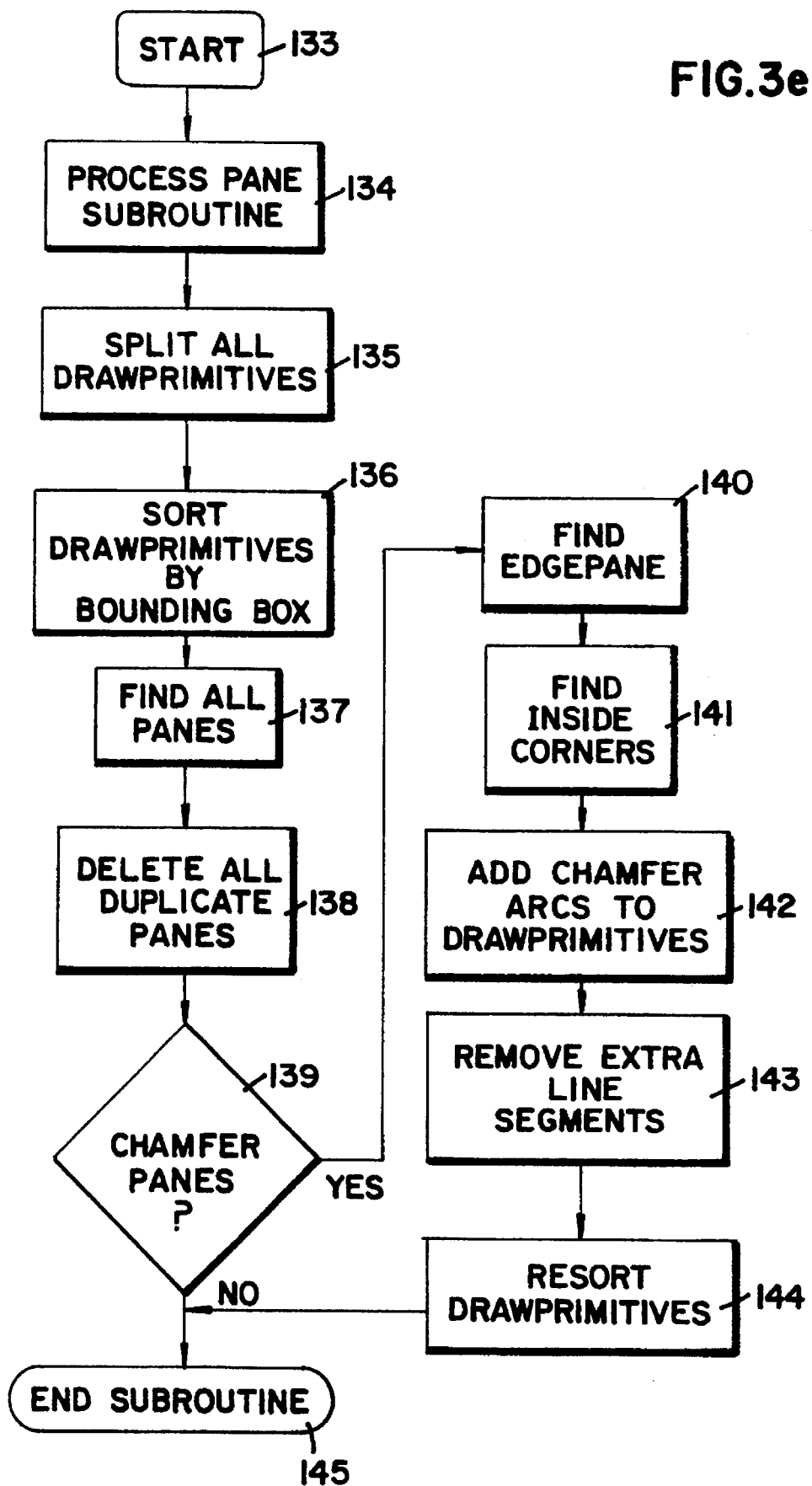
Figure 8:
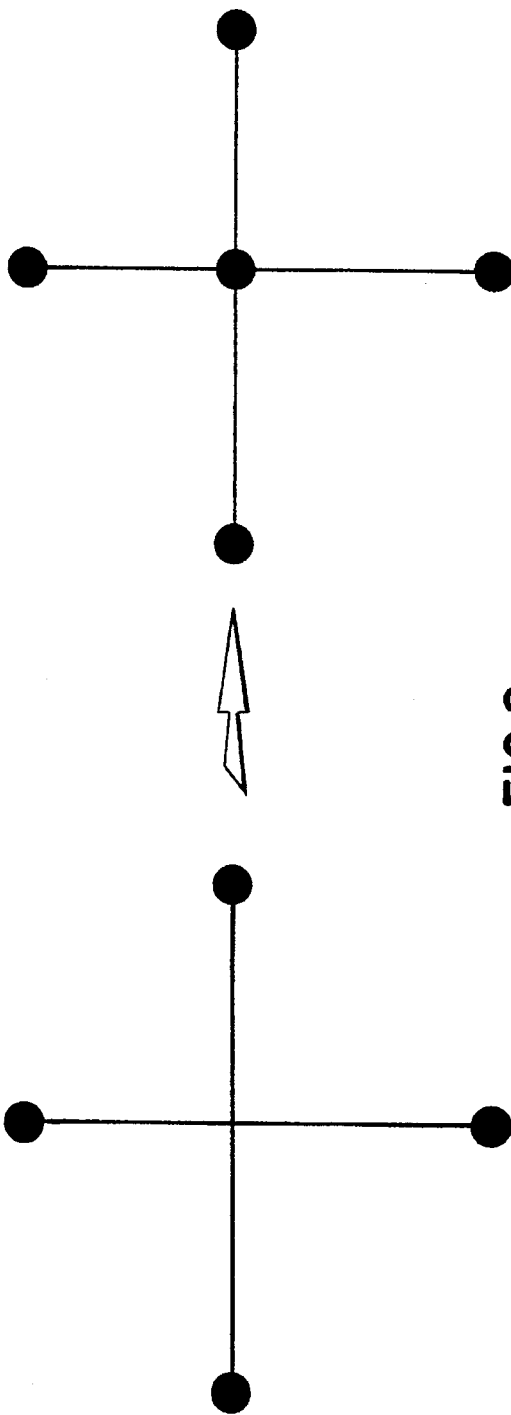
FIG. 8 is a diagrammatic illustration of determining a common intersection between two entities by the program logic.

Next a description of the process pane subroutine illustrated in FIG. 3e will be presented. The process pane subroutine begins at block 133 and proceeds to block 134. The first step at block 135 includes splitting all draw primitives. The routines in each of the modules of the manufacturing engine depend on the draw primitives having end points at all intersections. Accordingly, if two lines cross, then each line is cut at the intersection resulting in four lines where previously there were two. This is best seen in FIG. 8, where the midpoint of the two intersecting lines becomes an end point.

Microprocessor 24 next proceeds to block 136 where several optimizations occur. The first optimization is sorting. This consists of sorting the draw primitives by the minimum and maximum X and Y value bounding box. It will be appreciated by those skilled in the art that it is not necessary to continue finding intersections once the first non-intersecting X value is found, because all X values following must be larger and therefore non-intersecting.

An example of the bounding box concept and the manner in which the processor 20 determines the panes defined by the entities in the DXF file is illustrated in FIG. 9. As discussed above, the processor first sorts the entities by bounding box. The program then proceeds to block 137 where all panes are located.

To begin finding panes, the program begins at the first designated entity in the sorted list and traverses the entity twice—starting at each end-point and proceeding in opposite directions.

Figure 10B:
Figure 10B:
Figure 10B:

FIGS. 10aI–10aIV and 10bI–10bXII illustrate the process to find all panes and the edge pane. First at block 140, each draw primitive is located and a closed path is determined from the first end point to the second end point. This step is repeated from the second end point to the first end point. For example, this is accomplished by starting from point A and always moving clockwise toward point B. This is illustrated in FIGS. 10aI–10aIV. Similarly, the pane is then found by starting from point B and moving clockwise toward A. This is illustrated in FIG. 10bI–10bXII. Once each draw primitive has been traversed once in each direction, the processor stops traversing that draw primitive since it must have already been exhausted. Additionally, processor 24 looks for infinite loops, backtracking, traversal of more than all draw primitives, circles and closed polylines (i.e., where the start equals the end) and visits each draw primitive twice at a maximum. This is done by microprocessor 24 checking the dp_flag illustrated in FIG. 11.

Proceeding to block 138 any duplicate pane found is deleted. This is preferably accomplished by comparing each of the draw primitives making up the pane. Once the duplicate panes are deleted, controller 24 proceeds to block 139 where it is determined whether chamfer edges are requested. If chamfered edges are requested, then the edge panes are determined at block 140, and for each pane which is not an edge pane, inside corners are determined at block 141. Once each of the panes requiring chamfers are determined, chamfer arcs are added to draw primitives at block 142. Extra line segments are removed at block 143 and the draw primitives are resorted at block 144. The subroutine returns to the main program at block 145.

In this manner, DXF files are automatically converted to cutting instructions for use by a two dimensional cutting device without operator intervention. As noted above, the cutting instructions may be provided to the cutting device in real time or may be stored in a batch file for storage and/or latter transmission to the cutting device.

For a more detailed discussion of an apparatus and method useful for generating DXF files of various sizes which may be used by the present invention, reference may be had to the related application titled "RULE BASED PARAMETRIC DESIGN APPARATUS AND METHOD", filed on Feb. 11, 1994 (U.S. Ser. No. 194,922), the inventors of which are Randall W. Smith, Jason Bright, and Thomas Varghese, which is commonly assigned to Andersen Corporation (the assignee of the present invention), and which is hereby incorporated herein by reference.

For a more detailed discussion of an apparatus and method useful for constructing art glass design windows and panels and in which the present invention may form one part, reference may be had to the related application titled, "INTEGRATED METHOD OF SELECTING, ORDERING AND MANUFACTURING ART GLASS PANELS", filed on Feb. 11, 1994 (U.S. Ser. No. 195,257) the inventors of which are Loren Abraham, Michael F. Pilla, and Jason Bright, which is commonly assigned to Andersen Corporation (the assignee of the present invention), and which is hereby incorporated herein by reference.

It will be appreciated that the above described logic flow may take on any number of configurations and operational characteristics and are well known in the industry. Further, it is to be understood that even though numerous characteristics and advantages of the present invention have been set forth in the foregoing description, together with details of the structure and function of the invention, the disclosure is illustrative only and changes may be made in detail, especially in matters of the location of the DXF file and the data structure. Further, other modifications and alterations are well within the knowledge of those skilled in the art and are to be included within the broad scope of the appended claims.

What is claimed is:

1. A method for generating cutting instructions from a pattern stored in a known format, the format being of the type output from a computer aided design software program, comprising the steps of:

(a) loading a pattern from a known format into a computer memory location, wherein the pattern includes one or more draw primitives;

(b) applying a set of predetermined rules to the draw primitives to determine a cutting path along the one or more draw primitives without operator intervention, wherein the rules form a hierarchical structure such that finding the next draw primitive to be cut dictates subsequent draw primitives to be cut, and wherein the applying step includes the step of determining bounding boxes to rank the one or more draw primitives relative to one another; and (c) determining cutting instructions from the cutting path.

2. The method of claim 1, wherein the applying step further includes determining each separate item to be cut in the pattern by starting at opposing ends of each of the one or more draw primitives and traversing the draw primitive in opposite directions.

3. The method of claim 2, further comprising the step of storing information relative to traversing the draw primitive in a memory location, wherein duplicating traversing of draw primitives is minimized.

4. The method of claim 1, further comprising the step of translating the cutting instructions into computer numerical control language.

5. The method of claim 4, further comprising the step of communicating the cutting instructions to a two dimensional cutting device.

6. The method of claim 5, wherein the two dimensional cutting device is a waterjet and wherein the pattern is for art glass.

7. The method of claim 1, wherein the known format file is a DXF file.

8. A method of generating cutting instructions for a glass pattern having one or more panes formed with known objects, the objects including arcs, circles, lines, and complex objects and each object having known geometrical relationships to the other objects, the method comprising the steps of:

a) selecting a desired glass pattern;

b) reading the DXF file associated with the desired glass pattern;

c) sorting the list of objects according to the bounding box of the individual objects;

d) determining the location of each pane to be cut and the exterior edge of the pattern;

e) finding the starting pane to be cut according to predetermined criteria;

f) determining a cutting path along an object; and g) generating cutting instructions.

9. The method of claim 8, further comprising the step of transmitting the generated instructions to a cutting device.

10. The method of claim 8, further comprising repeating step f for each object and each pane to be cut.

11. The method of claim 10, further comprising the step of repeating steps e, f, and g for each color glass to be cut.

12. The method of claim 11, further comprising the step of extending the edges of the exterior panes of the pattern to create room for the exterior panes to be held by a frame.

13. An apparatus for generating cutting instructions for a waterjet device from an art glass pattern having one or more panes and stored in a DXF format file, the DXF format file being of the type output from a computer aided design software program, the apparatus comprising:

(a) means for reading a pattern including one or more draw primitives, wherein associated with the draw primitives is data representative of the spatial relationship between the draw primitives in the pattern;

(b) means for applying a set of predetermined rules to the draw primitives, wherein the panes are determined, and wherein the rules form a hierarchical structure such that finding the next draw primitive to be cut dictates subsequent draw primitives to be cut, and wherein the applying means includes bounding box determining means to rank the one or more draw primitives relative to one another; and (c) means for generating a cutting path along the ranked draw primitives, wherein cutting instructions are determined automatically without operator input.

14. The apparatus of claim 13, wherein the applying means further includes determining means for separating each pane to be cut in the pattern by starting at opposing ends of the each of the one or more draw primitives and traversing the draw primitives in opposite directions.

15. The apparatus of claim 14, further including a memory storage device for storing information relative to traversing the draw primitive in a memory location, wherein duplicating traversing of draw primitives is minimized.

16. The apparatus of claim 13, further comprising translating means for translating the cutting instructions into computer numerical control language.

17. A method for generating cutting instructions from a pattern stored in a known format, the format being of the type output from a computer aided design software program, comprising the steps of:

(a) loading a pattern from a known format into a computer memory location, wherein the pattern includes one or more draw primitives;

(b) applying a set of predetermined rules to the draw primitives to determine a cutting path along the one or more draw primitives without operator intervention, wherein the rules form a hierarchical structure such that finding the next draw primitive to be cut dictates subsequent draw primitives to be cut, and wherein the applying step includes determining each separate item to be cut in the pattern by starting at opposing ends of each of the one or more draw primitive and traversing the draw primitive in opposite directions; and (c) determining cutting instructions from the cutting path.

18. A method for generating cutting instructions from a pattern stored in a known format, the format being of the type output from a computer aided design software program, comprising the steps of:

(a) loading a pattern from a known format into a computer memory location, wherein the pattern includes one or more draw primitives;

(b) applying a set of predetermined rules to the draw primitives to determine a cutting path along the one or more draw primitives without operator intervention, wherein the rules form a hierarchical structure such that finding the next draw primitive to be cut dictates subsequent draw primitives to be cut, and wherein the applying step includes determining each separate item to be cut in the pattern by starting at opposing ends of each of the one or more draw primitive and traversing the draw primitive in opposite directions;

(c) storing information relative to traversing the draw primitive in a memory location, wherein duplicating traversing of draw primitives is minimized; and (d) determining cutting instructions from the cutting path.

19. An apparatus for generating cutting instructions for a waterjet device from an art glass pattern having one or more panes and stored in a DXF format file, the DXF format file being of the type output from a computer aided design software program, the apparatus comprising:

(a) means for reading a pattern including one or more draw primitives, wherein associated with the draw primitives is data representative of the spatial relationship between the draw primitives in the pattern;

(b) means for applying a set of predetermined rules to the draw primitives, wherein the draw primitives are ranked relative to one another and the panes are determined, and wherein the rules form a hierarchical structure such that finding the next draw primitive to be cut dictates subsequent draw primitives to be cut, and wherein the applying means includes determining means for separating each pane to be cut in the pattern by starting at opposing ends of each of the one or more draw primitives and traversing the draw primitives in opposite directions; and (c) means for generating a cutting path along the ranked draw primitives, wherein cutting instructions are determined automatically without operator input.

20. An apparatus for generating cutting instructions for a waterjet device from an art glass pattern having one or more panes and stored in a DXF format file, the DXF format file being of the type output from a computer aided design software program, the apparatus comprising:

(a) means for reading a pattern including one or more draw primitives, wherein associated with the draw primitives is data representative of the spatial relationship between the draw primitives in the pattern;

(b) means for applying a set of predetermined rules to the draw primitives, wherein the draw primitives are ranked relative to one another and the panes are determined, and wherein the rules form a hierarchical structure such that finding the next draw primitive to be cut dictates subsequent draw primitives to be cut, and wherein the applying means includes determining means for separating each pane to be cut in the pattern by starting at opposing ends of each of the one or more draw primitives and traversing the draw primitives in opposite directions;

(c) a memory storage device for storing information relative to traversing the draw primitive in a memory location, wherein duplicating traversing of draw primitives is minimized; and (d) means for generating a cutting path along the ranked draw primitives, wherein cutting instructions are determined automatically without operator input.

* * * * *